United States Patent [19]

Spangler

[11] Patent Number: 4,473,319
[45] Date of Patent: Sep. 25, 1984

[54] CONTROLLED RESURFACING OF ROADS AND THE LIKE

[75] Inventor: Elson B. Spangler, Bloomfield Hills, Mich.

[73] Assignee: Surface Dynamics Inc., Bloomfield Hills, Mich.

[21] Appl. No.: 372,323

[22] Filed: Apr. 27, 1982

[51] Int. Cl.³ .............................................. E01C 23/07
[52] U.S. Cl. ......................................... 404/72; 404/84; 73/146; 37/DIG. 20; 172/4.5; 299/1
[58] Field of Search ................... 404/84, 72; 299/1; 172/2, 4, 4.5; 37/108 R, DIG. 20; 73/146

[56] References Cited

U.S. PATENT DOCUMENTS

| | | | |
|---|---|---|---|
| 3,266,302 | 8/1966 | Spangler et al. | 73/146 X |
| 3,459,038 | 8/1969 | Swift | 73/146 |
| 3,564,986 | 2/1971 | Burgin | 404/84 |
| 3,779,661 | 12/1973 | Godbersen | 404/84 X |
| 3,953,145 | 4/1976 | Teach | 404/84 |
| 4,100,795 | 7/1978 | Panetti | 73/146 |
| 4,139,318 | 2/1979 | Jakob et al. | 404/84 X |
| 4,162,708 | 7/1979 | Johnson | 172/4.5 |
| 4,221,266 | 9/1980 | Fardal | 172/4 |
| 4,282,933 | 8/1981 | Suganami et al. | 172/4.5 |
| 4,422,322 | 12/1983 | Spangler | 73/146 X |

Primary Examiner—James A. Leppink
Assistant Examiner—Beverly E. Hjorth
Attorney, Agent, or Firm—Barnes, Kisselle, Raisch, Choate, Whittemore & Hulbert

[57] ABSTRACT

A method of resurfacing a road or the like wherein existing surface profile is first measured as a function of distance over the road surface. A desired profile is then identified as a function of measured road profile by simulating travel of a vehicle over the road surface and observing the quality of vehicle ride and/or pavement dynamic load while the spatial wavelength characteristics of measured profile are progressively attenuated. When ride quality and/or dynamic load of desired preselected standard is obtained, a resurface control signal is obtained as a conjoint function of distance along the road surface and the difference between measured profile and spatially attenuated profile. Road resurfacing equipment is also disclosed for selective removal of pavement surface material or selective deposition of paving material as a function of the control signal so obtained to achieve the desired resurfaced road profile.

8 Claims, 7 Drawing Figures

CONTROLLED RESURFACING OF ROADS AND THE LIKE

The present invention is directed to road resurfacing, and more particularly to a method for continuous control of road resurfacing equipment to obtain a final road surface of desired ride quality and/or dynamic load characteristics.

The term "road" is used herein in a generic sense to include highways, streets and the like commonly travelled by automotive vehicles, runways and other surfaces used by aircraft for takeoff and landing, and other types of surfaces travelled by vehicles for which vehicle ride quality is a consideration.

The term "ride quality" applies to a measure of dynamic response at the vehicle due to road surface variations encountered in normal operations. A typical ride quality standard employed in automotive and aircraft design might be root-mean-square acceleration experienced by a vehicle passenger due to undulations or irregularities in the road surface.

The term "dynamic load" applies to a measurement of dynamic response at the road surface—i.e. load forces applied by the vehicle to the road surface—due to surface variations encountered during normal operation. A typical dynamic load standard might be the number of dynamic load values that exceed a preselected threshold per unit of road distance.

OBJECTS AND SUMMARY OF THE INVENTION

An object of the present invention is to provide an improved method for controlled resurfacing of roadways and the like which is economical to implement and which is readily adapted for use in connection with a wide variety of vehicle travel-surface types.

Another object of the invention is to provide a road resurfacing method in which the resurfacing operation is selectively controlled to obtain a preselected quality of vehicle ride and/or dynamic load over the refinished road surface.

A further and yet more specific object of the invention is to provide a road resurfacing method wherein desired road surface profile is obtained as a function of existing road profile, and wherein resurfacing equipment is controlled as a conjoint function of a difference between desired and actual road profile and distance along the road surface.

Yet another object of the invention is to provide road resurfacing apparatus for implementing the method of the invention.

In accordance with a presently preferred embodiment or implementation of the method of the present invention as disclosed in the following detailed description, an actual measurement of road surface profile is first obtained as a function of distance over the road surface. This may be accomplished in accordance with the invention in its broadest aspects by manual surveying techniques or, more preferably, by performing such measurement with respect to the inertial plane of reference of a measurement vehicle driven over the road surface. A desired road profile is then identified as a function of measured profile by identifying a minimum desired ride quality and/or dynamic load standard, simulating a vehicle travelling over the measured road surface profile, and progressively filtering spatial wavelength content in the measured road profile until the desired ride quality and/or dynamic load standard for the simulation vehicle is obtained.

Typically, it is desired to remove the short wavelength (high frequency) surface undulations that yield an undesirable "bumpy" ride. However, the invention in its broadest aspects contemplates any selective variation in spatial wavelength content of the road surface, including the addition of short wavelength undulations in the nature of safety rumble strips.

Road resurfacing equipment in accordance with the invention is then propelled over the road surface and controlled as a conjoint function of distance along the road surface and a difference between measured profile and desired profile obtained by simulating vehicle response. Such road resurfacing equipment may include either grinding equipment or the like adapted for controlled selective removal of road surface material, or equipment for selectively applying or depositing bituminous material or the like to the road surface.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
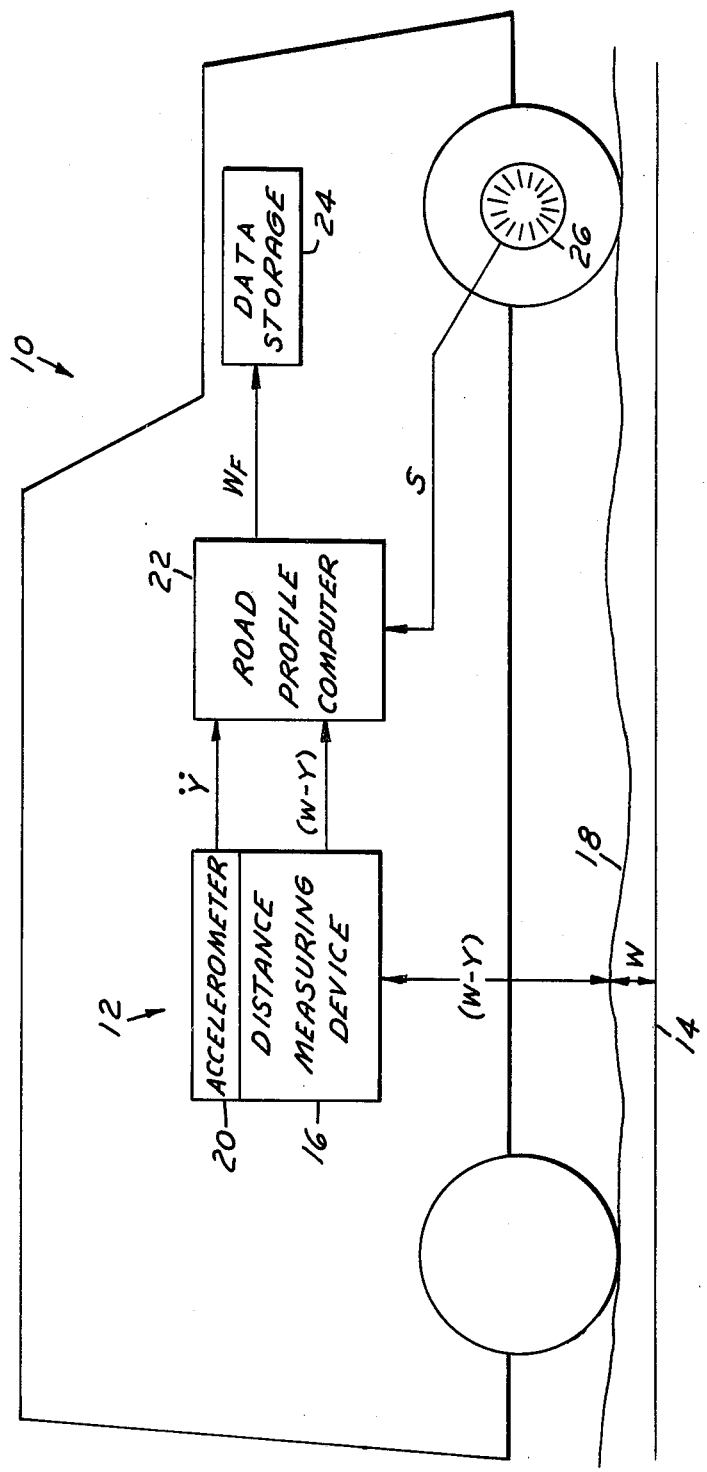
FIG. 1 is a schematic diagram of a vehicle equipped with road profile measurement apparatus.

FIG. 1 illustrates a vehicle 10 equipped with a road profile measurement apparatus or profilometer 12 for measuring road profile W as a distance from an imaginary plane 14 defined by the inertia element of an accelerometer 20 mounted on the sprung mass of vehicle 10. Apparatus 12 includes a distance measureing device or transducer 16 mounted with accelerometer 20 on the sprung mass of vehicle 10 for measuring the distance (W-Y) to the actual road surface 18, which distance varies as a function of the vehicle suspension system (not shown) as vehicle 10 travels over the road surface. Accelerometer 20 is carried by vehicle 10 and responsive to acceleration of the vehicle mass in a direction perpendicular to inertial reference plane 14 to provide the acceleration signal Y. Accelerometer 20 and distance transducer 16 direct their respective outputs to a road profile computer indicated generally at 22. A road travel distance measuring transducer 26 is suitably mounted to one of the vehicle wheels as shown, or to a separate "fifth wheel", so as to provide a periodic train of pulses S in response to travel of vehicle 10 over predetermined corresponding distance intervals.

Figure 2:
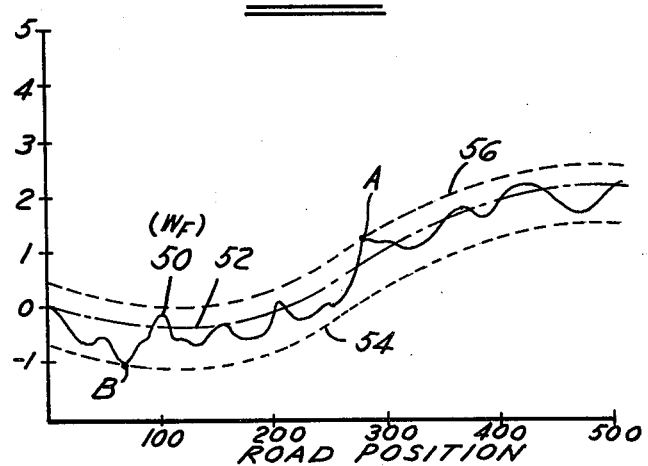
FIG. 2 is a graph of road surface profile versus position along the road surface useful in understanding operation of the invention.

The output $W_F$ of computer 22, which indicates profile W suitably filtered to highlight spatial frequency content of interest, is fed to a data storage device 24, such as a magnetic tape recorder or the like, for storing measured road profile $W_F$ as a function of distance travelled over the road surface. FIG. 2 illustrates in graphic form a measured profile 50 ($W_F$) for a hypothetical road surface, wherein the ordinate is in units of departure (such as centimeters or inches) from an arbitrary zero reference and the abscissa is distance along the road surface (such as meters or feet).

Road surface profilometer apparatus 12 useful in obtaining a measurement $W_F$ of road profile is disclosed in U.S. Pat. No. 3,266,302 and also in Spangler et al "A Method of Measuring Road Profile", GMR-452, General Motors Corp. (1964). These materials discuss in detail background theory and operation of road profilometry in general. A presently preferred apparatus 12 for obtaining a measurement of actual road profile for use in implementing the principles of the present invention is disclosed in the concurrently filed and copending U.S. application of the inventor herein, Ser. No. 372,322, now U.S. Pat. No. 4,422,322. Presently filed and copending U.S. application of the inventor herein, Ser. No. 372,322, now U.S. Pat. No. 4,422,322. The disclosures of said U.S. Patent, GMR publication and copending application are incorporated herein by reference.

As a next step in implementing the present invention, a desired resurfaced road profile is obtained by simulating vehicle travel over the measured actual road surface, and selectively altering measured surface spatial wavelength characteristics while considering the response of the simulation vehicle. Most preferably, such simulation is carried out on an analog or digital computer employing methods similar to those known and extensively used in both the automotive and aircraft industries to predict the dynamic response of vehicles during design stages to pavement surface conditions encountered in normal operation. A complete listing in BASIC source code language for obtaining desired road profile by the simulated vehicle process is set forth in the attached appendix which forms a part of this specification. The theory and operation of this simulation program will be detailed in the following discussion.

Figure 3:
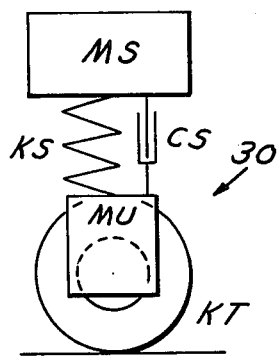
FIG. 3 is a schematic diagram of a simulation vehicle for use in obtaining desired road profile in accordance with the principles of the present invention.

FIG. 3 schematically illustrates a simulation vehicle 30 for assessing vehicle response to measured road surface, i.e. vehicle ride quality and/or dynamic load over the road surface, in two degrees of freedom. Vehicle simulation parameters include sprung vehicle mass MS, spring rate KS and damping characteristics CS of the vehicle suspension, unsprung mass MU of the wheel and axle, etc. and spring rate KT of the tire. In the vehicle ride simulation process, the vehicle 30 is effectively propelled over the measured road surface at a speed which corresponds to the normal vehicle velocity on the road surface in question, and acceleration of the sprung mass MS is observed as an indication of ride quality. Other measures of ride quality might be employed. Likewise, more complex vehicle simulation processes may be used where required.

Figure 4:
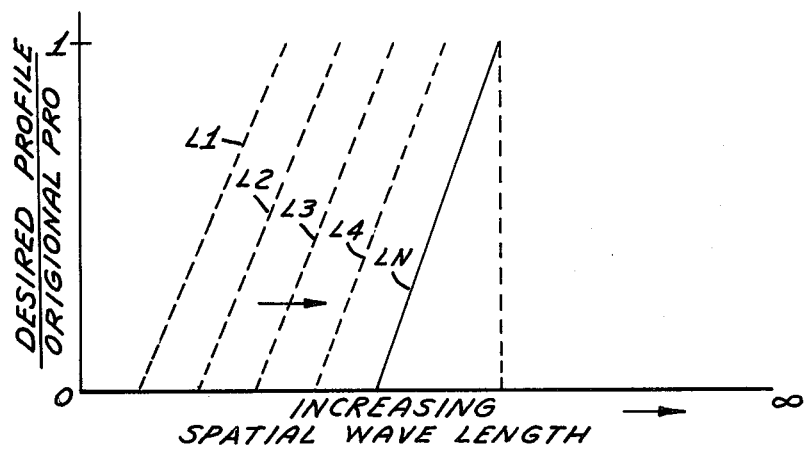
FIGS. 4 and 5 are graphs useful in understanding operation of the invention.

In order to improve ride quality and/or dynamic load during the simulation process, spatial wavelength content of measured profile 50 may be progressively increasingly filtered as illustrated graphically in FIG. 4, which has the effect of gradually smoothing out the short wavelength (high frequency) portions of the measured road profile. This simulation process is continued through spatial filter wavelength L1, L2, L3, L4, etc. until a filter wavelength LN is reached at which the simulated vehicle response or ride quality RF of sprung mass MS is equal to or less than a preset ride quality standard R. For example, low frequency spatial content of measured profile 50 may be gradually filtered until sprung mass MS exhibits zero acceleration at the simulation vehicle speed. This process results in a desired (spatially attenuated) road profile illustrated at 52 in FIG. 2 to which measured actual road profile 50 must be altered in order to obtain the desired ride quality and/or dynamic load standard utilized in the simulation process.

The next step of the resurfacing method in accordance with the invention involves graphic placement and comparison of the desired spatially attenuated profile 52 with respect to measured profile 50 to obtain an error control signal to be utilized in controlling the resurfacing equipment. If the road resurfacing equipment to be utilized is one which removes material from the road surface, the desired road profile 52 must be effectively graphically displaced to the position 54 at which all points on the desired road profile are at or beneath measured profile 50. In this example, desired road profile is identical with actual road profile only at point B in FIG. 2. Likewise, where the road resurfacing equipment is of a type which selectively deposits asphalt or other suitable material onto the road surface, the desired profile 52 must be raised to a position as illustrated at 56 in FIG. 2 when all points are at or above actual measured profile 50. In the latter example, desired profile is equal to actual profile only at the point A.

Figure 5:
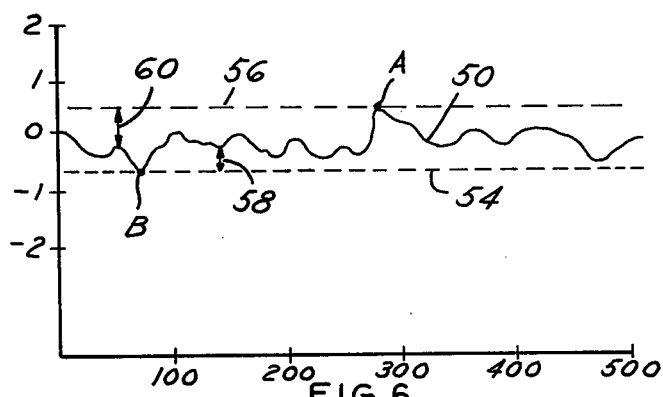

FIG. 5 graphically illustrates the control signals for both the removal and deposition resurfacing apparatus as a function of the difference between measured profile 50 and desired profile 54 or 56 versus distance along the road surface. Specifically, the control signal for a surface removal operation is represented by the difference 58 between measured profile 50 and desired profile 54, while the control signal for the controlled deposition of paving material is illustrated by the difference 60 between measured profile 50 and desired profile 56.

Figure 6:
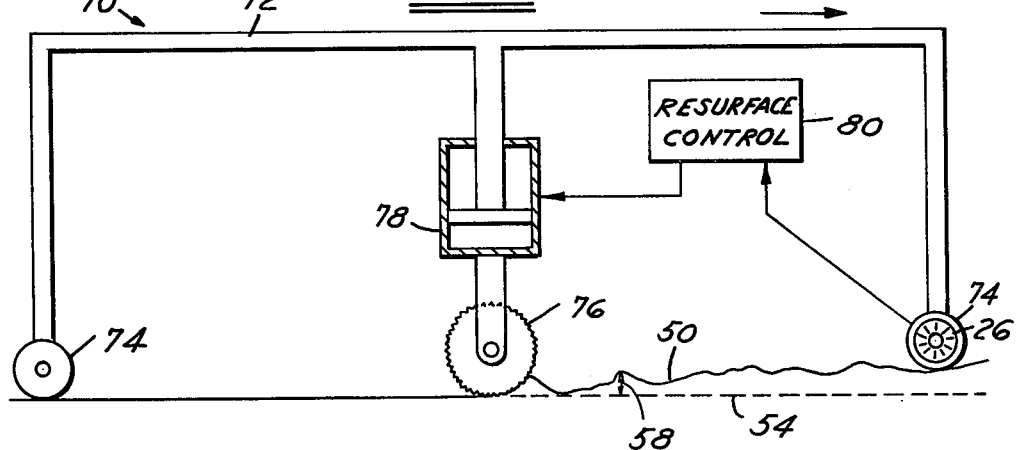
FIG. 6 is a schematic diagram of road surface removal equipment operated and controlled in accordance with the principles of the present invention to obtain desired road surface profile.
Figure 7:
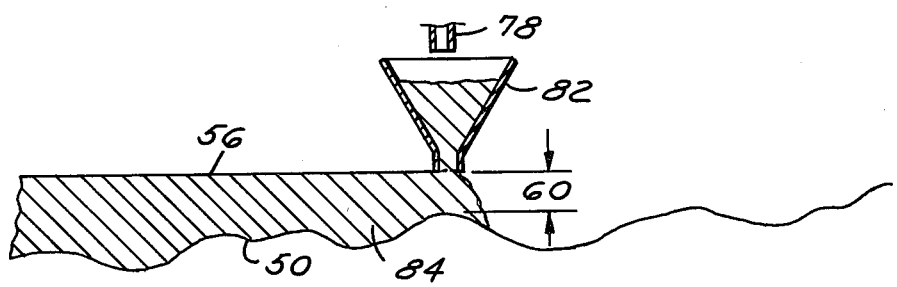
FIG. 7 is a schematic diagram of equipment for selectively applying road surface material controlled in accordance with the present invention.

FIG. 6 schematically illustrates grinding apparatus 70 for controlled removal of road surface material as comprising a frame 72 carried by wheels 74 for travel over the road surface, and a grinding wheel 76 suspended from frame 72 by a hydraulic cylinder 78. Surface control circuitry illustrated functionally at 80 is responsive to a distance transducer 26 carried by frame 72 for feeding control signal 58 (FIG. 5) to cylinder 78, and thereby effectively controlling the amount of material removed from the road surface to obtain the final road surface profile 54 of desired geometry. Similarly, FIG. 7 schematically illustrates pavement deposition apparatus as comprising a screed 82 controllably positioned with respect to a suitable frame for selectively applying paving material 84 of desired thickness to road surface 50 as a function of control signal 60 (FIG. 5). As a modified implementation of the apparatus of the invention not illustrated in the drawings, it is contemplated that the position of desired road profile 52 may be located with respect to actual measured profile 50 (FIG. 2) so as to obtain the most cost effective combination of both surface removal and surface deposition resurfacing apparatus.

Most preferably, grinding wheel 76 (FIG. 6) and/or screed 82 (FIG. 7) are additionally controlled laterally of the roadway to obtain a smooth (or banked) lateral profile. This may be accomplished by providing separately controlled cylinders 78 on laterally opposite sides of the resurfacing equipment. Each of these cylinders may be controlled from a corresponding control signal 58 or 60 obtained as previously described, and from a common distance transducer 26.

The invention claimed is:

1. A method of resurfacing an existing road surface or the like comprising the steps of:
   (a) obtaining a measurement of actual surface profile as a function of distance over the existing road surface,
   (b) identifying a desired road profile by electronically simulating characteristics of vehicle response travelling over the measured road surface profile while selectively electronically altering wavelength content of said measured profile until said characteristics of vehicle response achieve a preselected standard, and
   (c) modifying the existing road surface to obtain said desired profile by propelling road resurfacing equipment over the existing road surface while continuously controlling said road resurfacing equipment as a function of a difference between said desired profile and said measured profile.

2. The method set forth in claim 1 wherein said step (a) comprises the step of obtaining an electronic measurement signal indicative of actual surface profile as a function of distance over the road surface, and
   wherein said step (b) comprises the step of progressively electronically altering spatial wavelength content of said measurement signal until said characteristics of vehicle response achieve said standard.

3. The method set forth in claim 2 wherein said step (c) comprises the step of controlling said road resurfacing equipment as a conjoint function of distance over said road surface and said difference.

4. The method set forth in claim 3 wherein said step (b) of simulating characteristics of vehicle response comprises the steps of:
   (b1) identifying a minimum desired ride quality standard as a function of acceleration perpendicular to the measured profile of a simulated sprung vehicle mass travelling at preselected speed over said surface, and
   (b2) progressively increasingly filtering short spatial wavelengths in said measured profile until said ride quality standard is achieved.

5. The method set forth in claim 3 wherein said step (b) of simulating characteristics of vehicle ride comprises the steps of:
   (b1) identifying a minimum desired dynamic load standard as a function of forces applied to the road surface by a simulated sprung vehicle mass travelling at preselected speed over said surface, and
   (b2) progressively altering spatial wavelength content of said measured profile until said dynamic load standard is achieved.

6. The method set forth in claim 3 wherein said step (c) comprises the steps of:
   (c1) providing road surface refinishing equipment having an equipment frame carried for travel over said road surface and means controllably suspended from said frame for selectively altering portions of said road surface, and
   (c2) controlling the position of said surface altering means with respect to said vehicle frame as said conjoint function of distance over said road surface and said difference between said desired profile and said measured profile.

7. The method set forth in claim 6 wherein said means comprises means for selectively removing surface material from said road surface.

8. The method set forth in claim 6 wherein said means comprises means for selectively applying surface material to said road surface.

* * * * *